(12) United States Patent
Shimakage

(10) Patent No.: US 7,106,886 B2
(45) Date of Patent: Sep. 12, 2006

(54) ROAD WHITE LINE RECOGNITION APPARATUS AND METHOD

(75) Inventor: Masayasu Shimakage, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 749 days.

(21) Appl. No.: 10/288,376

(22) Filed: Nov. 6, 2002

(65) Prior Publication Data

US 2003/0103649 A1    Jun. 5, 2003

(30) Foreign Application Priority Data

Nov. 30, 2001    (JP) ............................. 2001-367542

(51) Int. Cl.
*G06K 9/00*    (2006.01)
(52) U.S. Cl. .................... 382/104; 382/181; 404/12
(58) Field of Classification Search ............... 382/104, 382/106; 340/901, 902, 903, 904, 435, 2.23, 340/944, 995.19, 995.21, 995.27; 404/1, 404/11, 15, 71, 95, 136, 12, 58, 75, 89; 701/23–26, 701/202, 209, 210, 211, 203; 348/116–120
See application file for complete search history.

(56) References Cited

U.S. PATENT DOCUMENTS

| | | | |
|---|---|---|---|
| 5,835,614 A * | 11/1998 | Aoyama et al. ............ 382/104 |
| 5,848,374 A * | 12/1998 | Wakabayashi et al. ...... 701/212 |
| 5,874,904 A * | 2/1999 | Hirabayashi et al. ....... 340/903 |
| 6,477,260 B1 * | 11/2002 | Shimomura ................. 382/106 |
| 6,813,370 B1 * | 11/2004 | Arai ........................... 382/104 |
| 2002/0042676 A1 | 4/2002 | Furusho |
| 2002/0061123 A1 | 5/2002 | Akutagawa |
| 2002/0080019 A1 | 6/2002 | Satoh et al. |
| 2002/0081001 A1 | 6/2002 | Tsuji |

FOREIGN PATENT DOCUMENTS

| JP | 63-172261 A | 7/1988 |
|---|---|---|
| JP | 5-347000 A | 12/1993 |
| JP | 8-5388 A | 1/1996 |
| JP | 10-143646 A | 5/1998 |

* cited by examiner

*Primary Examiner*—Matthew C. Bella
*Assistant Examiner*—Abolfazl Tabatabai
(74) *Attorney, Agent, or Firm*—Foley & Lardner LLP

(57) ABSTRACT

In road white line recognition apparatus and method, a road extended in a forward direction of a vehicle is photographed through a photographing device, a deflection luminance information when a luminance information of an image photographed by the photographing device is represented by a luminance information that a surface of the road naturally has and the deflection luminance information from which the luminance information that the road surface naturally has is excluded is detected on the basis of an approximation function obtained by approximating the luminance information of the photographed image to a horizontal direction of the photographed image, a normalized luminance information is detected by removing the deflection luminance information from the luminance information of the photographed image, and a road white line is detected on the basis of the normalized luminance information.

20 Claims, 11 Drawing Sheets

BEFORE NORMALIZATION (BEFORE CORRECTION)

AFTER NORMALIZATION (AFTER CORRECTION)

ROAD WHITE LINE RECOGNITION APPARATUS AND METHOD

BACKGROUND OF THE INVENTION

1. Field of the Invention

The present invention relates to road white line recognition apparatus and method to recognize a road white line used for displaying a traffic lane divisional zone on a road surface on which the vehicle travels.

2. Description of the Related Art

Various techniques for recognizing a road white line (or road white lines) through a monitor image and a relationship between the vehicle and the road white line is used for a vehicular automatic control or partially for an automatic control (for example, a vehicular velocity control system or a vehicular lane keep control system) have conventionally been proposed.

A Japanese Patent Application First Publication No. Heisei 5-347000published on Dec. 27, 1993 discloses a previously proposed road white line recognition apparatus. In the disclosed road white line recognition apparatus, white line candidate points constituting each road white line are detected from the photographed image and a road shape or a posture of photographing means such as a camera to obtain the photographed image is estimated on the basis of positional coordinates of the white line candidate points. At this time, a processing region (hereinafter, referred to a threshold value calculating region) to calculate a luminance (or gray level) threshold value of the photographed image used to extract white line candidate points is set by threshold value calculation region setting means, a position and a range of the threshold value calculating region are dynamically varied, and the threshold value of the luminance of the photographed image used to extract the white line is calculated by a combination of a maximum value and an average value of the luminance in the threshold value calculating region so that an assured extraction of the road white line can be achieved even if a contrast of the photographed image is varied.

In details, as described above, whenever the photographed image is inputted, the luminance threshold value of the photographed image used to extract the white line from the photographed image is calculated. Hence, the luminance threshold value used to extract the white line is dynamically updated. Thus, with respect to a variation in a contrast on a road image, a capability of extracting the white line from the photographed image is optimized. Hence, even if the contrast between the white line and road surface is varied due to such a change in a quantity of light of a surrounding of the road surface as is found in a difference in a day time and in a night time, a variation in a white line detection capability can be reduced.

SUMMARY OF THE INVENTION

In a case where the contrast of a road image is varied, the luminance threshold value is dynamically corrected. Hence, it is possible to reduce a performance deterioration of detecting the white line against a contrast variation between the white line and road surface developed in a case where the vehicle has entered such a road surface that a paint state of the white line becomes thin due to a wear of the road white line caused by repetitive vehicular tires' run on the road surface and against a contrast variation between the white line and paved road surface developed when a quantity of light inputted to the photographing means is reduced due to a change in a weather from a fine weather to a cloudy weather. That is to say, the luminance value (gray level value) of the whole photographed image of an ordinary road surface during the fine weather or cloudy weather is substantially uniform and only an optical density of pixels (luminance) on the white line corresponding portion of the image indicates a prominent value. Hence, since a clear difference in the gray level of pixels (luminance) occurs between the white line corresponding portion and any portion other than the white line, the white line can be detected with high accuracy.

However, especially during a rainy weather, as a vehicle body becomes approached to a front center or as a distance from the photographing means to a photographed object, viz., to a white line segment becomes long, a reflected light due to a water film becomes intense (the quantity of light becomes increased). Hence, a deflection of the luminance over the photographed image within the threshold value calculating region to calculate the luminance (gray level) threshold value used to extract the white line from the region cannot be neglected. The luminance of the image portion having the film of water is often approximately equal to or higher than that of the white line. Therefore,it is difficult to set an appropriate threshold value of the luminance since a maximum value of the luminance within the threshold value calculating region corresponds to that of a portion having the film of water or an average gray level within the threshold value calculating region becomes approached to the luminance value of the white line or maximum luminance value thereof. Such a phenomenon as described above occurs not only during the rainy weather but also during a vehicular run at an exit of a tunnel or in a tunnel. That is to say, such a phenomenon as described above is easy to occur in such cases where light beams enter directly the photographing means from each light source as governed by an optical phenomenon and there is a road surface on which the light beams are easy to be reflected or as a plurality of light sources are present.

An erroneous detection of the white line brings an operation stop of the whole system. It is, hence, necessary to solve a problem such that the threshold value is not appropriately set due to not only a contrast variation in terms of time but also a spatial luminance deflection.

It is, hence, an object of the present invention to provide road white line recognition apparatus and method which are capable of detecting accurately the road white line irrespective of a spatial deflection of the luminance.

According to one aspect of the present invention, there is provided a road white line recognition apparatus, comprising: a photographing device that photographs a road extended in a forward direction of a vehicle; a deflection luminance detecting section that detects a deflection luminance information when a luminance information of an image photographed by the photographing device is represented by a luminance information that a surface of the road naturally has and the deflection luminance information from which the luminance information that the road surface naturally has is excluded on the basis of an approximation function obtained by approximating the luminance information of the photographed image to a horizontal direction of the photographed image; a normalized luminance information detecting section that detects a normalized luminance information by excluding the deflection luminance information from the luminance information of the photographed image; and a road white line detecting section that detects a road white line on the basis of the normalized luminance information detected by the normalized luminance information detecting section.

According to another aspect of the present invention, there is provided a road white line recognition method, comprising: photographing a road extended in a forward direction of a vehicle through a photographing device; detecting a deflection luminance information when a luminance information of an image photographed by the photographing device is represented by a luminance information that a surface of the road naturally has and the deflection luminance information from which the luminance information that the road surface naturally has is excluded on the basis of an approximation function obtained by approximating the luminance information of the photographed image to a horizontal direction of the photographed image; detecting a normalized luminance information by excluding the deflection luminance information from the luminance information of the photographed image; and detecting a road white line on the basis of the detected normalized luminance information.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 1:
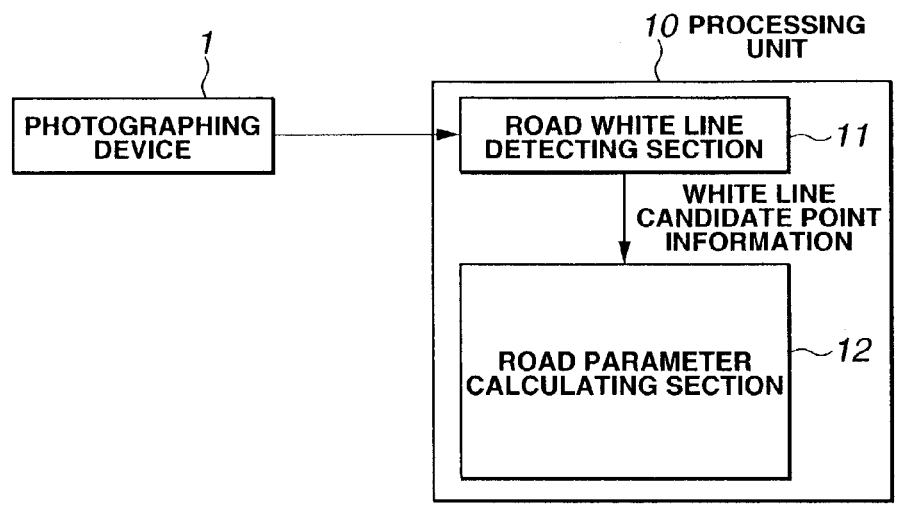
FIG. 1 is a rough configuration view of a road white line recognition apparatus in a preferred embodiment according to the present invention.
Figure 2A:
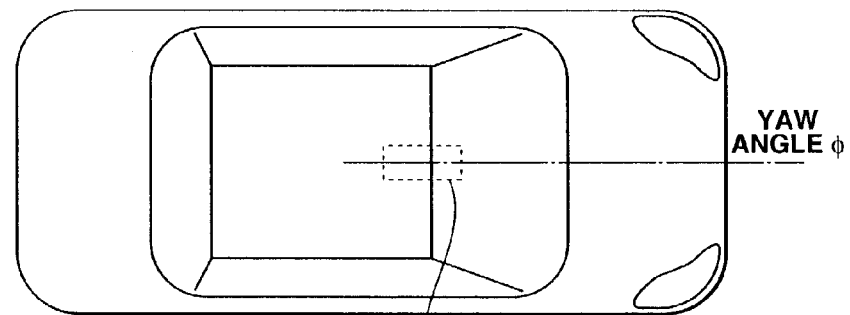
FIGS. 2A and 2B are explanatory views for explaining a mounted position of a photographing device shown in FIG. 1.
Figure 2B:
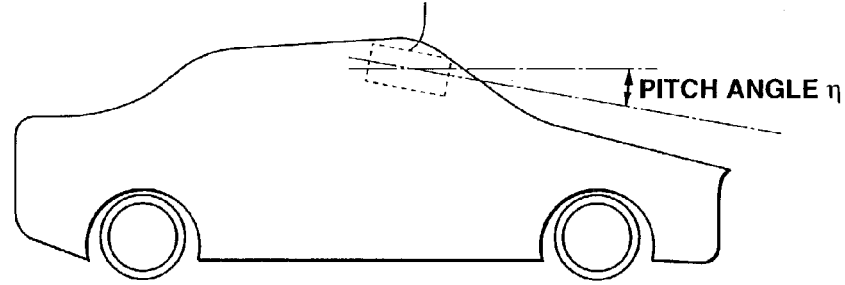

FIG. 1 shows a configuration view representing a preferred embodiment of a road white line recognition apparatus according to the present invention. In FIG. 1, a photographing device 1 constituted by a CCD (Charge Coupled Device) camera or so forth is mounted, for example, as shown in FIGS. 2A and 2B, on an upper middle part of a front windshield of a vehicle body within a vehicle compartment which is located at a center in a vehicular width direction. Then, a, so-called, a yaw angle φ between an optical axis of a lens of photographing device 1 and a vehicular center line is set to zero and a, so-called, pitch angle η is $α_{rad}$. A vehicular surrounding environment including a road segment located on a front area of the vehicle is photographed. The photograph information photographed by above-described photographing deice 1 is inputted into a processing unit 10. Processing unit 10 carries out a detection of white line candidate points at a road white line detecting section 11 on the basis of the photograph information and estimates road parameters at a road parameter calculating section 12 on the basis of a result of detection of the white line candidate points.

Figure 3:
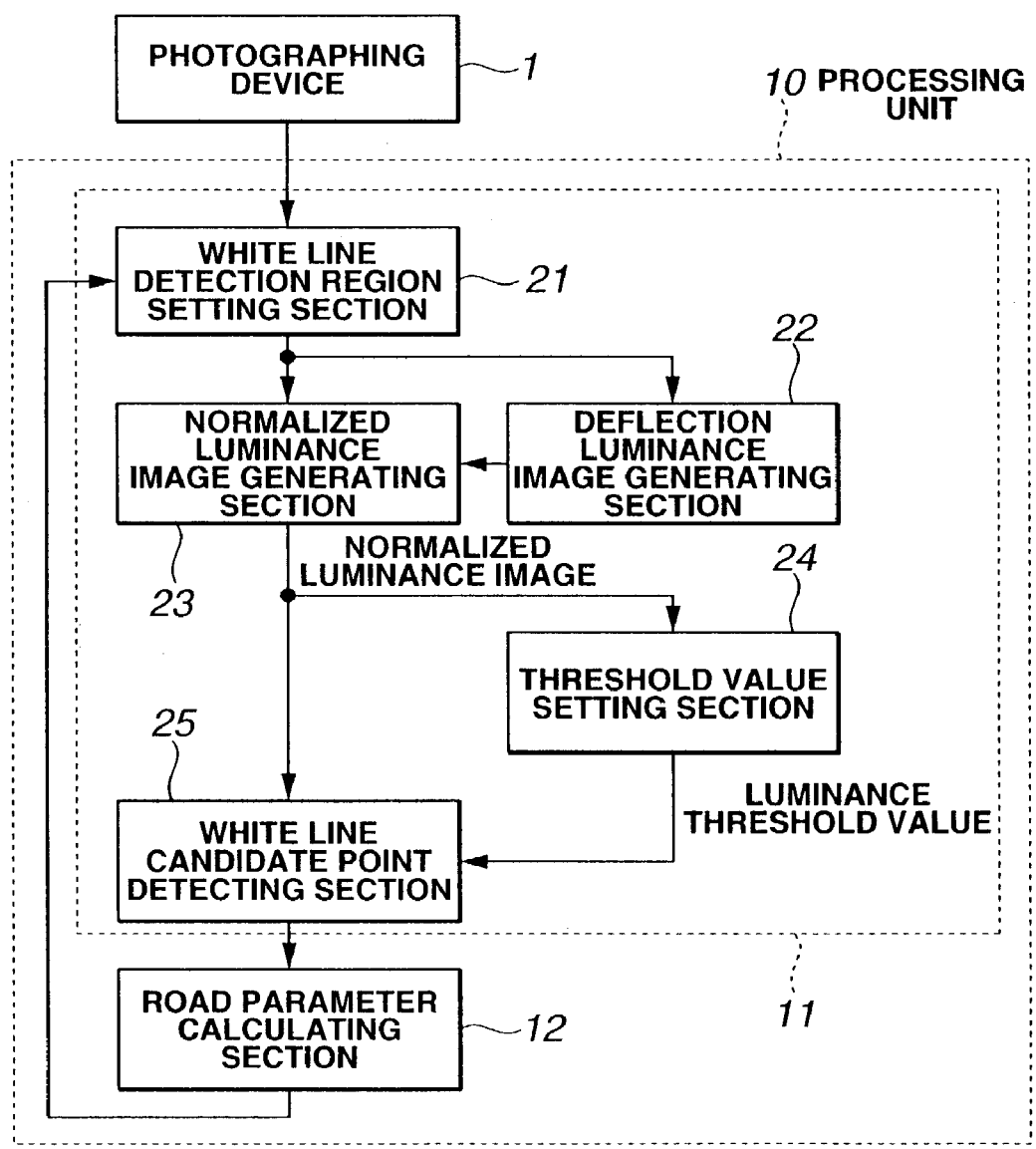
FIG. 3 is a functional block diagram of a processing unit shown in FIG. 1.
Figure 4:
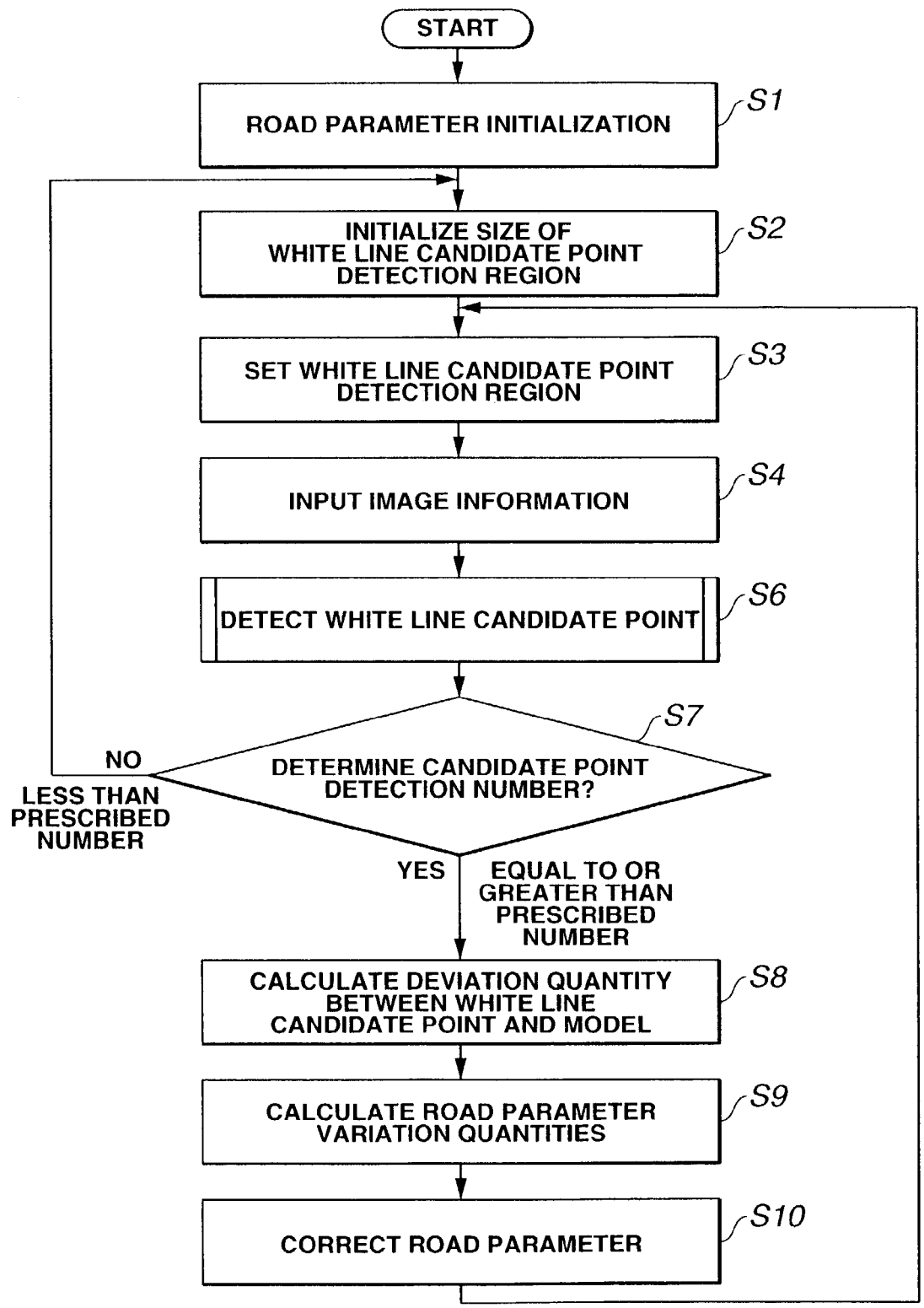
FIG. 4 is a general operational flowchart representing an example of procedure of a road white line detection in the road white line recognition apparatus shown in FIG. 1.
Figure 5:
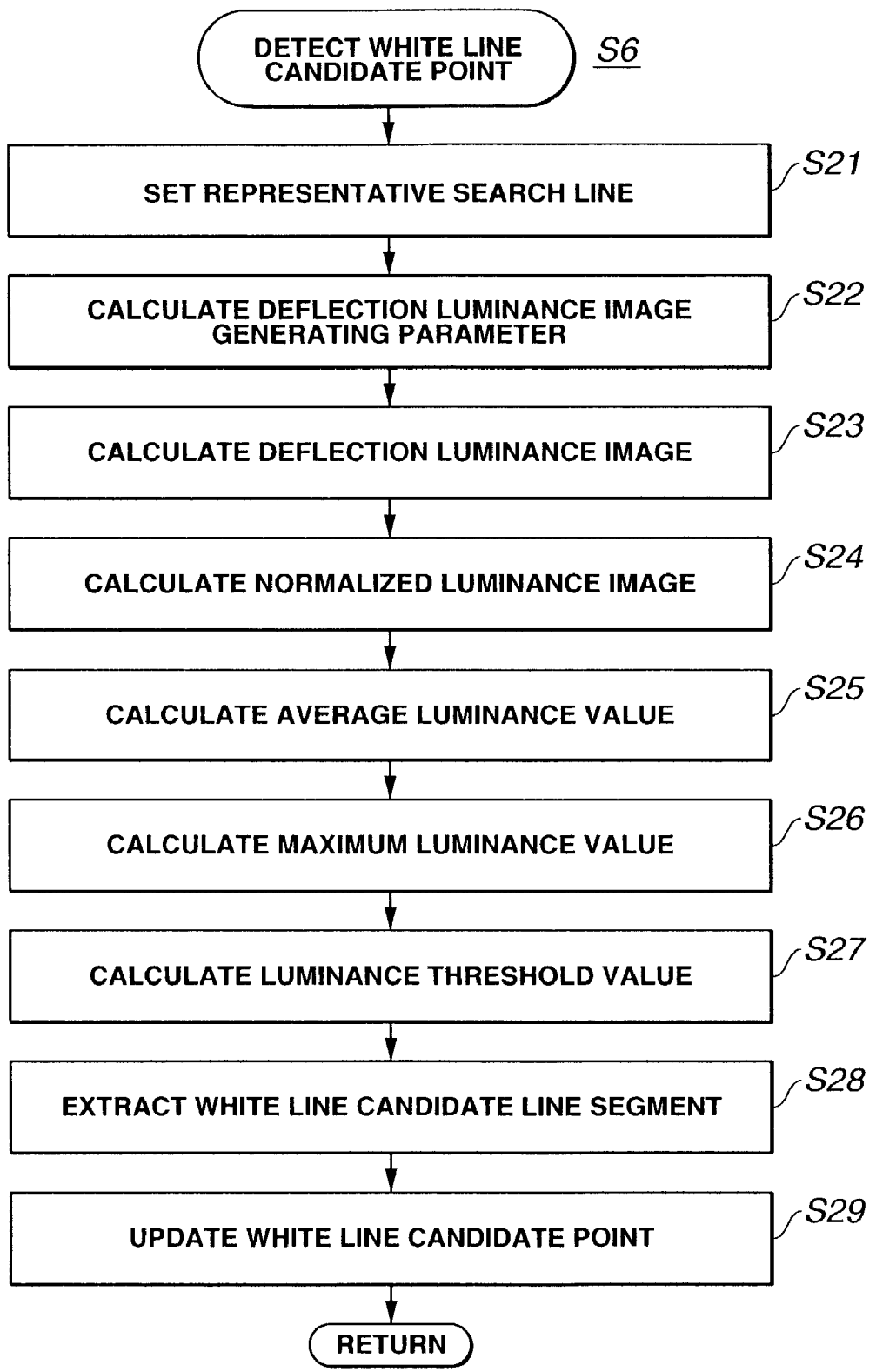
FIG. 5 is a detailed flowchart representing an example of a detailed procedure on a white line candidate point detection in FIG. 4.

FIG. 3 shows a functional block diagram of processing unit 10. FIGS. 4 and 5 show operational flowcharts representing one example of a processing procedure of a road white line detection to detect the road white lines executed by processing unit 10.

As shown in FIG. 3, processing unit 10 includes: a white line detecting region setting section 21 that sets a plurality of white line candidate point detecting regions on the basis of estimated values of the road parameters which are prior to one sampling time; a deflection luminance image generating section 22 that generates a deflection luminance image as will be described later on the basis of the image information from photographing device 1; a normalized luminance image generating section 23 that generates a normalized luminance image as will be described later on the basis of the deflection luminance image generated by deflection luminance image generating section 22 and the image information from photographing device 1; a threshold value setting section 24 that sets a threshold value to detect white line candidate points on the basis of the normalized image detected by normalized luminance image generating section 23; and a white line candidate point detecting section 25 that detects the white line candidate points on the basis of the normalized luminance image and the threshold value set at threshold value setting section 24.

Then, the following procedure shown in FIG. 4 is carried out at processing unit 10.

First, at a step S1 of FIG. 4, processing unit 10 initializes parameters representing a road shape or vehicular motion (so-called, the road parameters).

Figure 6:
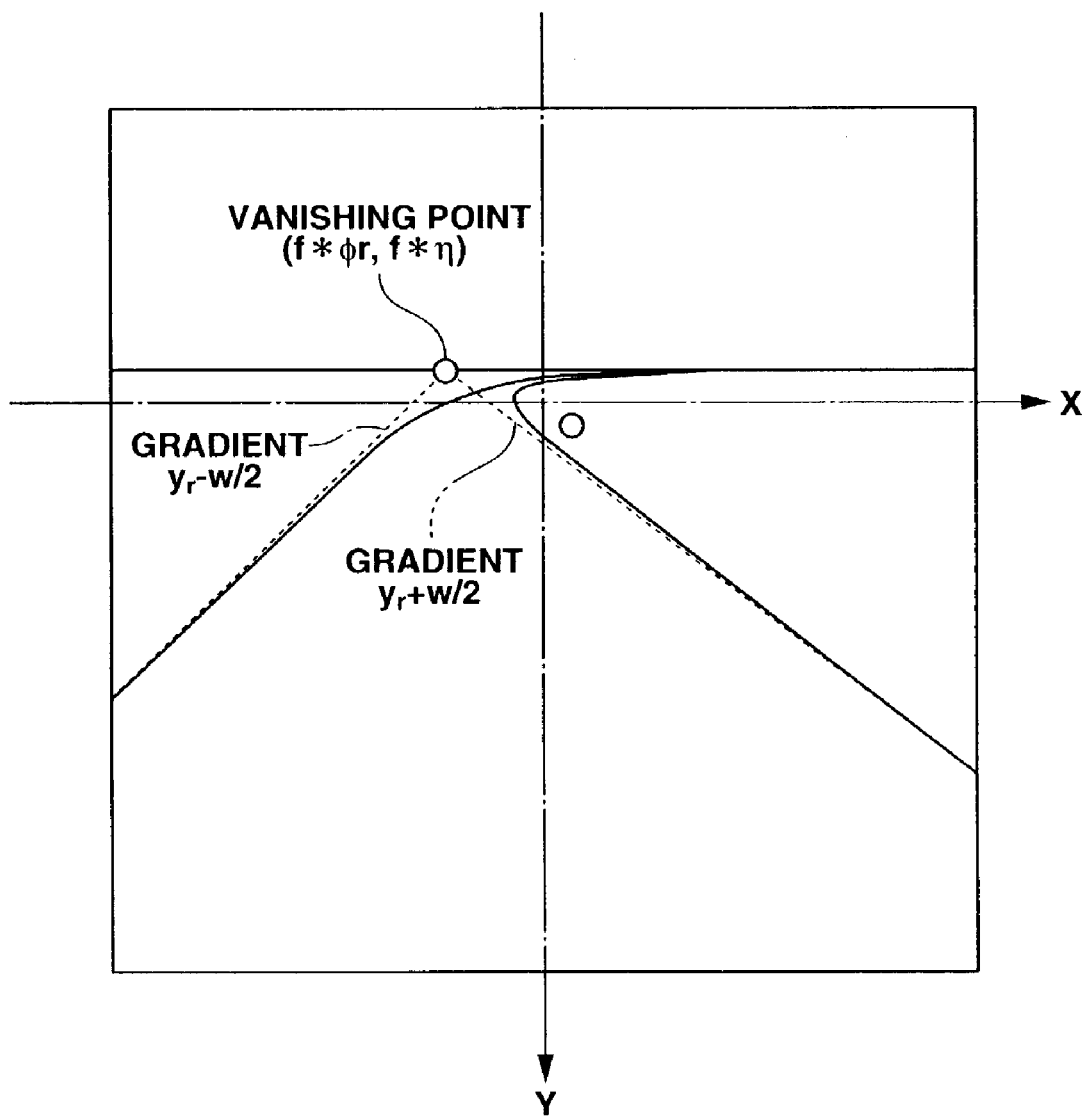
FIG. 6 is an explanatory view for explaining a road white line model.

That is to say, on an image screen coordinate system O-XY as shown in FIG. 6, a white line model of the road white line is expressed as in the following equation (1) using the road parameters.

$$X=\{y_r+(i-\tfrac{1}{2})*w\}*(Y+f\eta)/h-f^2h\rho/\{2(Y+f\eta)\}+f\phi_r \quad (1).$$

In equation (1), i is set to 0 (i=0) in a case of a left-side white line of a traffic lane and is set to 1 (i=1) in a case of a right-side white line of the traffic lane. In addition, in equation (1), $y_r$, $\rho$, $\phi_r$, $\eta$, and w denote road parameters. If a height h of photographing device 1 from road surface is constant, their road parameters represent the following road or white line shape or vehicular motion.

That is to say, $y_r$ denotes a lateral displacement of the vehicle within the traffic lane, $\rho$ denotes a road curvature (an inversed number of a radius of curvature); $\phi_r$ denotes a yaw angle of the vehicle (the optical axis of photographing device 1) with respect to the road, $\eta$ denotes the pitch angle of the vehicle (the optical axis of photographing device 1 with respect to the road), and w denotes a traffic lane width of the road, respectively.

Since, at an initial state, the shapes of the road and white line and the vehicular motion are unknown, a value, for example, which corresponds to a center value is set to each road parameter as its initial value. That is to say, a traffic lane center is set as the initial value of lateral displacement $y_r$ of the vehicle within the traffic lane ($y_r=0$), a straight line is set ($\rho=0$) as the initial value of road radius of curvature $\rho$ ($\rho=0$). Zero is set as the initial value of yaw angle $\phi_x$ with respect to the traffic lane ($\phi_x=0$). A stopped state is set as the initial value of pitch angle $\eta$ with respect to the traffic lane ($\eta=\alpha_{rad}$). A traffic lane width of a freeway prescribed in a road construction law is set as the initial value of the traffic lane width w.

Figure 7:
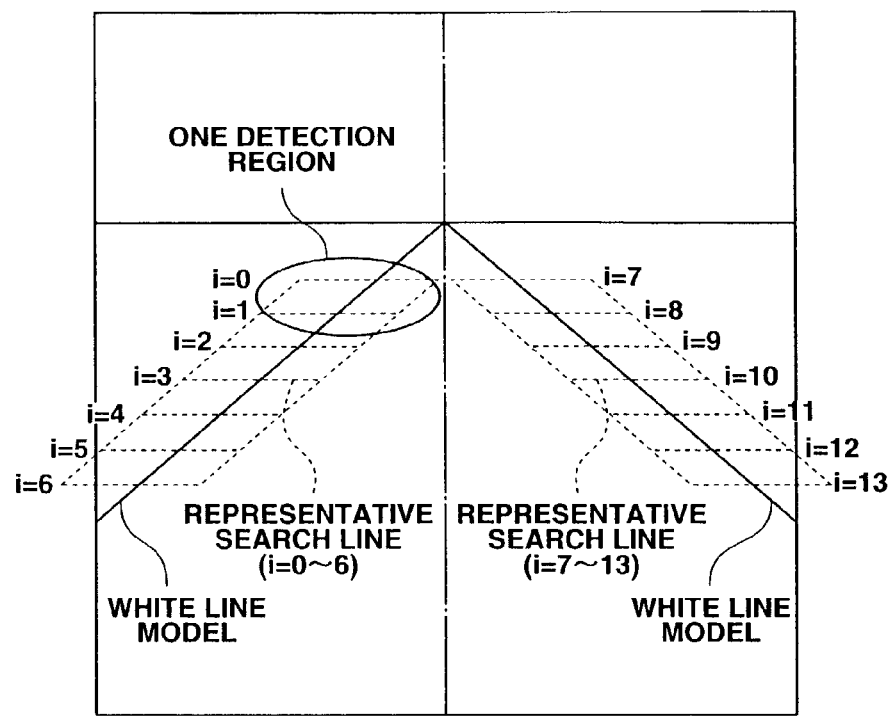
FIG. 7 is an explanatory view for explaining an initial setting method of a plurality of white line candidate point detecting regions.

Next, the routine goes to a step S2 shown in FIG. 4. As shown in FIG. 7, processing unit 10 executes an initialization on a size of each white line candidate point detecting region. In the example shown in FIG. 7, six white line candidate point detecting regions for each of left-side and right-side road white lines, i.e., twelve regions as a total are set. It is noted that there is a possibility that a large difference occurs between the white line models in which their respective initial values are set to the road parameters and actual road white lines on the image screen in the initial stage. Hence, it is preferable to set larger white line candidate point detecting regions if possible.

Figure 8:
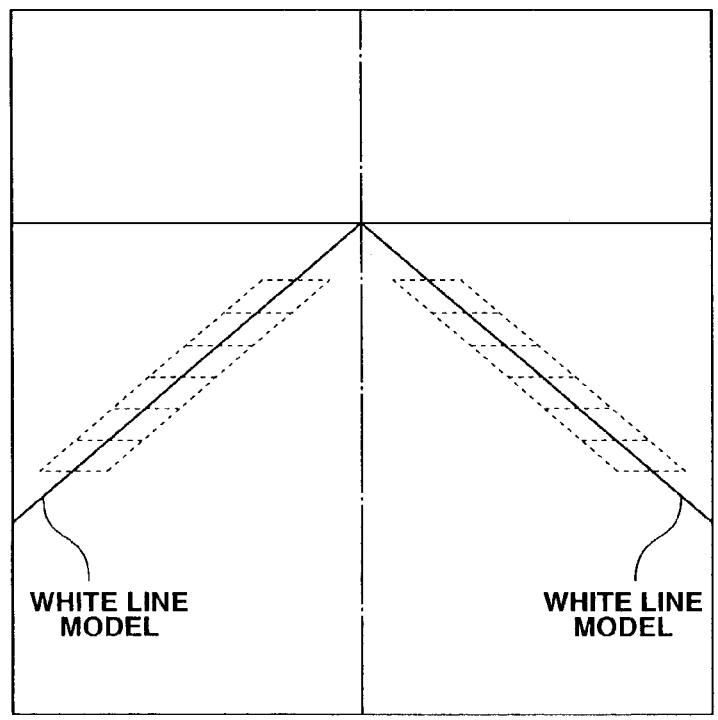
FIG. 8 is an explanatory view for explaining a setting method of the white line candidate point detecting regions in a case where the road white lines are already detected.

In addition, in a case where each of the left-side and right-side road white lines is already detected, the difference between the actual road white line on the image screen and the corresponding white line model may be smaller. Hence, as shown in FIG. 8, if the size of each white line candidate point detection region is set to be as small as possible, a processing speed can be improved. In this case, each white line candidate point detecting region may be set in a well-known procedure using one of the road parameters already detected.

Figure 9:
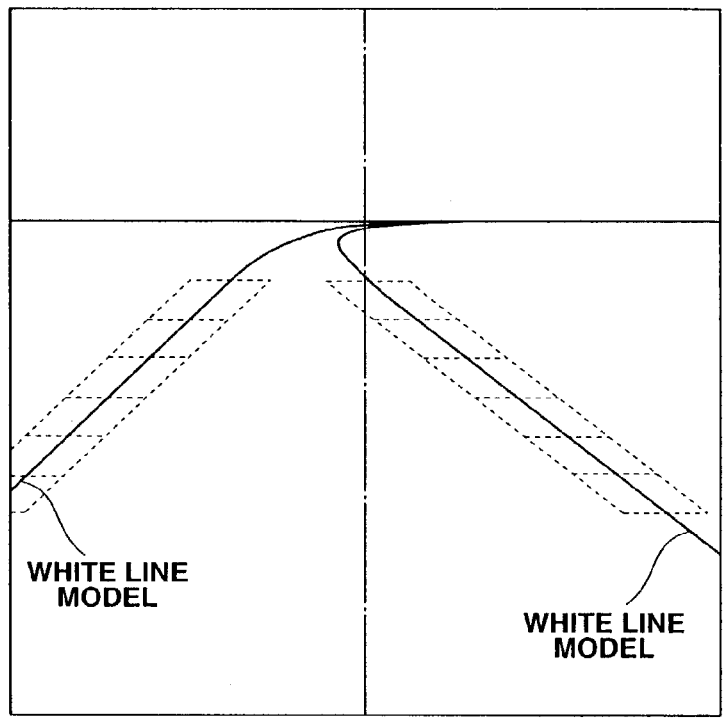
FIG. 9 is an explanatory view for explaining a setting method of the white line candidate point detecting regions on a photographed image.

Next, at a step S3 shown in FIG. 4, processing unit 10 sets the white line candidate point detecting regions for a photographed image based on the image information inputted from photographing device 1 during the previous processing time. It is noted that, during the initial state, processing unit 10 sets the white line candidate point detecting regions for one of the white line models in which the initial values are set to the road parameters at the initial stage. In details, on the basis of the side of each white line candidate point detecting region calculated at step S2 and the white line model based on the road parameters initialized at step S1 or those corrected at a step S9 as will be described later, white line candidate point detecting regions are set so that the white line models based on the road parameters are a center of region. It is noted that FIG. 9 shows a state in which six white line candidate point detecting regions for each of the left-side and right-side white line candidate detecting regions, i.e., a totally twelve regions are set.

Next, the routine of FIG. 4 goes to a step S4 in which the image information photographed by the photographing unit 10 is inputted thereinto.

Then, at a step S6, processing unit 10 executes a detection process of white line candidate points in white line candidate detecting regions set at step S3. Detection process of white line candidate points is carried out at a detailed procedure shown in a flowchart of FIG. 5.

It is noted that, in the photograph image, for example, a leftmost, uppermost position coordinate is assumed to be an origin of an XY coordinate system, a horizontal rightward direction is a positive direction of an X axis, and a vertical downward direction is a positive direction of a Y axis.

First, at a step S21 of FIG. 5, representative search lines are set. As the representative search lines, for example, an upper side of each white line candidate point detecting region and a lower side of a lowest white line candidate point detecting region are set.

For example, in the case of FIG. 9, since six white line candidate point detecting regions for the respective left and right white line models are set, the representative search lines are seven for each of the left and right white line models. It is noted that a selection method of representative search lines is not limited to the above-described method. Each representative search line may be a line by which parameters on all white line candidate point detecting regions can be calculated by performing an interpolation process or extrapolation process which is to be carried out at a step S22 as will be described later. For example, an X-axis directional line at a center position of Y-axis direction of each white line candidate point detecting region may be set as one or each of the representative search lines.

Next, the routine of FIG. 5 goes to step S22. At step S22, processing unit 10 calculates parameters for generating a deflection luminance image.

The above-described deflection luminance is defined as a lowest order component of the luminance value of the photographed image from which variation components are removed. In details, for example, luminance value $P(X, Y_i)$ at coordinates $(X, Y_i)$ of the photographed image is expressed as follows:

$$P(X, Y_i)=A_0(Y_i)+A_1(Y_i)X+f(X, Y_i) \quad (2).$$

When the following equation (3) is established, deflection luminance $P_{tend}(X, Y_i)$ is defined as a zero-order deflection luminance. In addition, when the following equation (4) is established, deflection luminance $P_{tend}(X, Y_i)$ is defined as a first-order deflection luminance.

$$P_{tend}(X, Y_i)=A_0(Y_i) \quad (3).$$

$$P_{tend}(X, Y_i)=A_0(Y_i)+A_1(Y_i)X(A_0(Y_i)\neq 0) \quad (4).$$

It is noted that function $f(X, Y_i)$ in equation (2) is an arbitrary function representing the luminance value that the white line naturally has without deflection components of the luminance information due to an influence of water film present on the road surface.

In details, a coefficient $A_1(Y_i)$ indicates a small value in a case where the deflection on the luminance is small. In a case where the image becomes brighter in the positive direction of X-axis coordinate, i.e., the luminance value becomes larger, $A_1$ indicates a positive value. On the contrary, in a case where the image becomes darker in the positive direction of X axis, i.e., in a case where the luminance value becomes smaller, $A_1$ indicates a negative value.

If equation (2) is generally described, luminance value $P(X, Y)$ at an arbitrary point $(X, Y)$ on the image can be represented in the following equation (5).

$$P(X, Y) = P(X_0, Y_0) + \tag{5}$$
$$\left\{ \frac{\partial P(X_0, Y_0)}{\partial X}(X - X_0) + \frac{\partial P(X_0, Y_0)}{\partial Y}(Y - Y_0) \right\} +$$
$$\frac{1}{2} \left\{ \frac{\partial^2 P(X_0, Y_0)}{\partial X^2}(X - X_0)^2 + \frac{\partial^2 P(X_0, Y_0)}{\partial Y^2}(Y - Y_0)^2 \right\}.$$

Equation (5) is a Taylor series expansion with a point on image $(X_0, Y_0)$ as a center. If $X_0=0$ and $Y=Y_0=Y_i$, the following equation (6) can be derived. That is to say, equation (2) represents a case in which, in equation (5) describing the general luminance value, the following equation (7) is established.

$$P(X, Y_i) = P(0, Y_i) + \frac{\partial P(0, Y_i)}{\partial X} X + \frac{1}{2} \frac{\partial^2 P(X_0, Y_i)}{\partial X^2} X^2 + \ldots . \tag{6}$$

$$X_0 = 0, Y = Y_0 = Y_i, A_0(Y_i) = P(0, Y_i), \tag{7}$$
$$A_1(Y_i) = \frac{\partial P(0, Y_i)}{\partial X}, f(X, Y_i) = \frac{1}{2} \frac{\partial^2 P(X_0, Y_i)}{\partial X^2} X^2 + \ldots .$$

Next, a method for calculating the parameters used for generating the deflection luminance image will be described below.

The luminance value of the deflection luminance of a pixel on each representative search line can be expressed in the following equation (8). It is noted that i described in equation (8) is an index to discriminate the representative search line, X and $Y_i$ are variables representing coordinates of the pixel to be noticed, and i represents an Y coordinate of a certain representative search line.

$$P^*(X, Y_i) = a(Y_i)X + b(Y_i) = aiX + bi \tag{8}$$

Parameters ai and bi which minimize an elevation function J expressed by the following equation (9) through a method of least squares with the luminance value of each pixel based on image information inputted from photographing device 1 as $P(X, Y)$ are calculated for all representative search lines.

$X_0(i)$ and $X_1(i)$ satisfy a value such as $X_0(i)<X_1(i)$ and represents X coordinates at both left and right end positions of the respective representative search lines. Above equation (9) represents a square root of a difference between the deflection luminance and actual luminance in the corresponding representative search line.

$$J_i = \sum_{X=X_0(i)}^{X_1(i)} \{P*(X, Y_i) - P(X, Y_i)\}^2 \tag{9}$$
$$= \sum_{X=X_0(i)}^{X_1(i)} \{aiX + bi - P(X, Y_i)\}^2$$

Then, a picture image expressed by $P^*(X, Y_i)$ which minimizes evaluation function J of the above-described equation (9) is defined as the deflection luminance image in the representative search line i. $P^*(X, Y)$ obtained as a result of an execution for all white line candidate point detection region is defined as a deflection luminance image at the corresponding white line candidate point detection region. It is noted that at a process at a step S23 as will be described later, the same processing as step S22 is not carried out in all white line candidate point regions in order to secure a continuity in a space of the deflection luminance image and to shorten a calculation time but parameters ai and bi perform the interpolation on the Y coordinate direction and the calculation in equation (7) is carried out using the interpolation processed parameter. The luminance image thus calculated is defined as deflection luminance image. Then, parameters ai and bi satisfy equation (9) are calculated as follows: That is to say, if function f(x) is expressed as $f(x)=ax+b$, f(x) is obtained from data (a, b) of N couples, coefficients a and b which minimize evaluation function J expressed by the following equation (10) can be calculated by the following equation (12) since the following equation (11) is established.

$$J = \sum_{k=1}^{N} \{f(x_k) - y_k\}^2 = \sum_{k=1}^{N} \{ax_k + b - y_k\}^2. \tag{10}$$

$$\left[\frac{\partial J}{\partial a} \frac{\partial J}{\partial b}\right]^T = 2 \sum_{k=1}^{N} \begin{bmatrix} ax_k^2 + bx_k - x_k y_k \\ ax_k + b - y_k \end{bmatrix}$$
$$= 2N \begin{bmatrix} a\overline{S}xx + b\overline{S}x - \overline{S}xy \\ a\overline{S}x + b - \overline{S}y \end{bmatrix}$$
$$= 0$$

$$\overline{S}x = \frac{1}{N}\sum_{k=1}^{n} x_k, \overline{S}y = \frac{1}{N}\sum_{k=1}^{N} y_k, \overline{S}xx = \frac{1}{N}\sum_{k=1}^{N} x_k^2, \tag{11}$$
$$\overline{S}xy = \frac{1}{N}\sum_{k=1}^{N} x_k y_k.$$

$$\begin{bmatrix} a \\ b \end{bmatrix} = \begin{bmatrix} \overline{S}xx & \overline{S}x \\ \overline{S}x & 1 \end{bmatrix}^{-1} \begin{bmatrix} \overline{S}xy \\ \overline{S}y \end{bmatrix} \tag{12}$$
$$= \frac{1}{Sxx - \{Sx\}^2} \begin{bmatrix} \overline{S}xy - \overline{S}x\overline{S}y \\ \overline{S}xx\overline{S}y - \overline{S}xy\overline{S}x \end{bmatrix}.$$

Hence, by applying this process into the approximation equation of above-described equation (7), parameters ai and bi for developing the deflection luminance image at all representative search lines. In this way, when deflection luminance image generating parameters ai and bi are calculated, the routine goes to a step S23 at which the deflection luminance image at white line candidate point detecting region is calculated. In details, using the following equation (13), for coefficients ai and bi on the representative search lines adjoined on upper and lower portions, linear interpolations on Y coordinate of the picture image are individually and separately carried out for the respective representative search lines corresponding road left and right side white lines so that coefficients $A_R(Y)$ and $B_R(Y)$ and coefficients $A_L(Y)$ and $B_L(Y)$ are calculated.

$$\begin{bmatrix} A(Y) \\ B(Y) \end{bmatrix} = \frac{1}{Y_{i+1} - Y_i} \begin{bmatrix} (Y_{i+1} - Y)a_i + (Y - Y_i)a_{i+1} \\ (Y_{i+1} - Y)b_i + (Y - Y_i)b_{i+1} \end{bmatrix}, \quad (13)$$

wherein $Y_i \leq Y \leq Y_{i+1}$.

Figure 10:
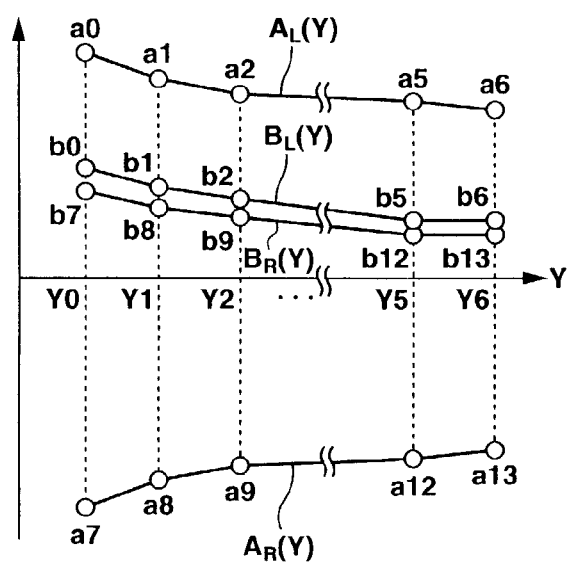
FIG. 10 an explanatory view for explaining interpolations for deflection luminance image generating parameters in a case where a luminance information of the photographed image is approximated to a first-order function.

FIG. 10 shows one example of the calculation of the parameters of ai and bi when a linear interpolation is carried out using the coefficients of the representative search lines. A lateral axis of FIG. 10 represents the representative search line and a longitudinal axis thereof represents coefficients ai and bi. It is noted that i=0 through 13 and i=0 through 6 corresponds to the left-side white line. Then, i=7 through 13 corresponds to the right-side white line. As shown by FIG. 10, coefficients $A_R(Y)$ which correspond to the right-side white line candidate point detecting regions indicate are positive, the luminance in the right-side white line candidate point detecting regions indicate that, as X coordinate becomes large, the luminance is increased. On the other hand, since coefficients AL(Y) at left-side white line candidate point detecting regions are negative values, the luminance value becomes small as the X coordinate becomes large.

Then, processing unit 10 calculates a deflection luminance $P_{tend}(X, Y)$ at all white line candidate point detecting regions using coefficients $A_R(Y)$, $B_R(Y)$, $A_L(Y)$, and $B_L(Y)$ related to Y-axis coordinates of the photographed image. This can be calculated from the following equation (14). The image represented by the deflection luminance thus calculated is defined as deflection luminance image.

$$P_{tend}(X, Y) = A(Y)X + B(Y) \quad (14).$$

Next, the routine shown in FIG. 5 goes to a step S24 in which processing unit 10 calculates the normalized luminance image in each white line candidate point detecting region. This normalized luminance image is calculated on the basis of the following equation (15). As shown in equation (15), processing unit 10 subtracts the luminance value of the deflection luminance image calculated at step S23 from the luminance value of the photographed image inputted from photographing device 1 to calculate a new luminance value $P_{nom}$. The image represented by this luminance value $P_{nom}$ is defined as the normalized luminance image.

$$P_{nom}(X, Y) = P(X, Y) - P_{tend}(X, Y) \quad (15).$$

It is noted that luminance deflection image $P_{tend}$ is such that the luminance value of the photographed image by photographing device 1 is approximated by means of a first-order function with respect to the X-axis direction of the photographed image and the deflection luminance image in the X-axis direction in each representative search line is linear interpolated on the Y-axis direction of the photographed image so that a high-frequency component thereof is eliminated related to the luminance value with respect to a spatial luminance variation. If deflection luminance image $P_{tend}$ is calculated using a merely spatial low-pass filter, normalized luminance image $P_{nom}$ is, so-called, a differential image such that the photographed image is merely high pass filtered and the image becomes such a state that an edge portion of the luminance is extracted and only emphasized. That is to say, all of the luminance information is lost and only any point at which the luminance variation is large is resulted to be only extracted.

Whereas, at step S23, a spatial low-frequency component of the deflection luminance image is extracted using such a low-order function as the first-order function not merely through a low-pass filter (LPF). The deflection luminance image provides an image such that a spatial luminance deflection is extracted as a drift component of the luminance. Therefore, normalized luminance image $P_{nom}$ calculated from equation (15) can be obtained as an image whose luminance deflection is corrected with respect to one sheet of luminance image information inputted from the photographing device 1.

It is noted that the process at step S24 is not necessary to carry out over the whole photographed image but is carried out within only the white line candidate point detecting regions already set at step S3. Hence, the quantity of the whole arithmetic operations to be executed by processing unit 10 can be reduced.

Next, the routine goes to a step S25 in which processing unit 10 calculates an average luminance $P_{mean}(i)$ for each white line candidate point detecting region for the normalized luminance image calculated at step S24. This mean luminance $P_{mean}(i)$ may be calculated using all of the luminance information (gray level information) within the white line candidate point detecting regions set, for example, at step S3 or an average luminance at the representative search line may be the average luminance $P_{mean}(i)$ at the corresponding one of the white line candidate point detecting regions to which one of the representative search lines belongs. In addition, an average value of the average luminance of the representative search lines located at upper and lower representative search lines of the white line candidate point detecting region may be the average luminance value $P_{mean}(i)$ of the corresponding white line candidate point detecting region. As described above, the reduction in the number of pixels used for calculation permits the operation time duration to be shortened.

Next, the routine shown in FIG. 5 goes to a step S26. At step S26, processing unit 10 calculates a maximum luminance $P_{max}(i)$ in one of the white line candidate point detecting regions. This calculation is carried out for each white line candidate point detecting region. Maximum luminance $P_{max}(i)$ nay be calculated using all of the luminance information (gray level information) within the corresponding white line candidate point detecting region. Or alternatively, maximum luminance $P_{max}(i)$ on the representative search line may be the maximum luminance $P_{max}(i)$ of the corresponding white line candidate point detecting region to which the above-described representative search line belongs. Or alternatively, an average value of the maximum luminance values (maximum gray levels) of upper and lower representative search lines defining the corresponding white line candidate point detecting region may be the maximum luminance $P_{max}(i)$ within the corresponding white line candidate point detecting region. The larger one of the maximum luminance values on the upper and lower representative search lines to calculate the average value described above may be the maximum luminance $P_{max}(i)$ of the corresponding white line candidate point detecting region. Thus, a calculation time for processing unit 10 to calculate the maximum luminance value $P_{max}(i)$ can be shortened by reducing the number of pixels used for the calculation.

Next, at a step S27, processing unit 10 calculates a luminance threshold value T(i) to detect the white line(s) for each white line candidate point detecting region. This luminance threshold value T(i) is calculated on the basis of the following equation (16) from average luminance $P_{mean}(i)$ calculated at step S25 and maximum luminance $P_{max}(i)$ calculated at step s26.

$$T(i) = \zeta P_{max}(i) + (1-\zeta) P_{mean}(i) \quad (16),$$

wherein $$0 < \zeta < 1.$$

Figure 11:
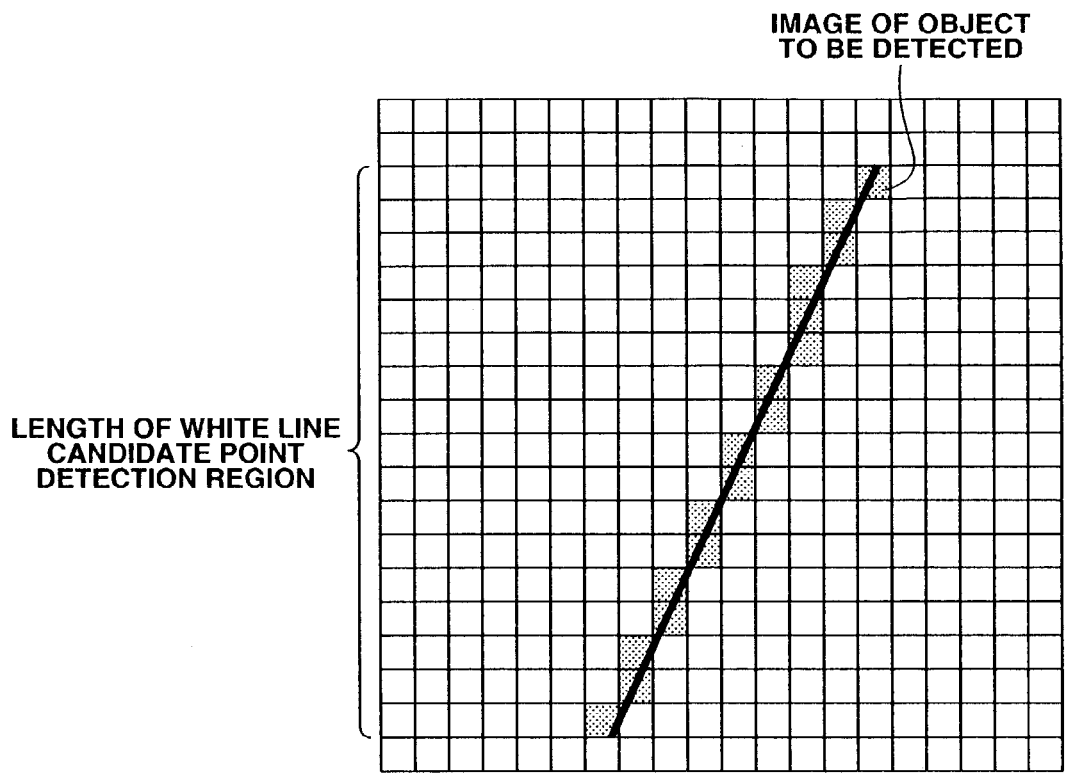
FIG. 11 is an explanatory view for explaining a detection method of white line candidate points in one of white line candidate point detecting regions.

Next, the routine goes to a step S28. At step S28, a binarization process is carried out for normalized luminance image $P_{nom}$ on the basis of the luminance threshold value T(i) set as described above. An extraction process of a white line candidate line segment at each white line candidate point detecting region for the binarized normalized luminance image. Specifically, all line segments constituted by connecting between any one point of the upper side of the white line candidate point detecting regions to any one point of the lower side of the same white line candidate point detecting region are searched. Next, processing unit 10 measures the number of pixels on the line segments which are all of the searched line segments and whose gray levels are equal to or higher than the threshold value T(i) calculated at step S27, as shown in FIG. 11. Then, after the number of the pixels which satisfy the above condition are measured for all line segments, one of the line segments on which the number of pixels whose gray levels are equal to or higher than threshold value T(i) are greatest (most) is selected as a white line candidate line segment for the corresponding white line candidate point detecting region.

Next, the routine shown in FIG. 5 goes to a step S29. At step S29, both of a start point of the selected white line candidate line segment and an end point thereof are detected. These points are white line candidate points in the corresponding white line candidate point detecting region. At this time, if the number of the pixels on the above-described line segment whose respective gray levels are equal to or higher than threshold value T(i) are less than a prescribed number, processing unit 10 determines that any white line candidate point is not detected. The prescribed number is, for example, set on the basis of an arbitrarily set rate to a vertical length of the white line candidate point detecting region. It is noted that this rate may be the same for all of the white line candidate point detecting regions but may be made different for each white line candidate point detecting region.

In details, when, with the upper most and left most coordinate in the photographed image as a reference, a horizontal rightward direction is assumed to be the positive direction of the X axis and a vertical lower direction is assumed to be the positive direction of the Y axis, processing unit 10 determines that the white line candidate points have been detected when, for example, the Y-axis direction of the detecting region is 15 pixels and the number of pixels whose gray levels are equal to or higher than the threshold value T(i) are ½, namely, 8 pixels or more have been detected. In this case, if the number of pixels on the selected white line candidate line segment on which the number of pixels whose gray levels are equal to or higher than threshold value T(i) are greatest are less than 8 pixels, processing unit 10 determines that no white line candidate point is detected in the corresponding white line candidate point detecting region. On the other hand, if the number of pixels on the selected white line candidate line segment on which the number of pixels whose gray levels are equal to or higher than threshold value T(i) is the greatest (most) is equal to or higher than 8 pixels, processing unit 10 determines that the white line candidate points have been detected and the start and end points of the corresponding line segments can be assumed to be the white line candidate points. It is noted that a positional coordinate (X, Y) of either the start point of the line segment or the end point thereof is normally the white line candidate point.

Figure 12:
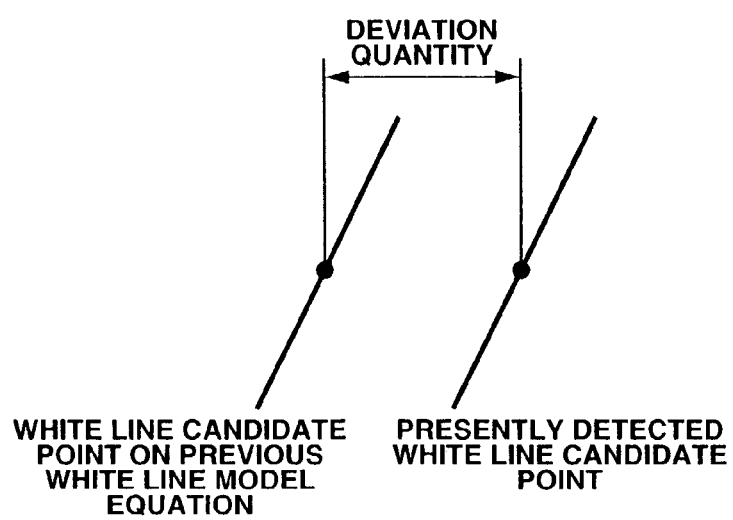
FIG. 12 is an explanatory view for explaining a deviation quantity between a presently detected white line model and a previously detected white line model.

Then, the above-described series of processing is executed for all white line candidate point detecting regions. If the white line candidate point is detected as described above (step S6), the routine shown in FIG. 4 goes to a step S7. At step S7, processing unit 10 determines whether a total number of white line candidate points detected by all of the white line candidate point detecting regions is equal to or greater than a prescribed value. If less than the prescribed value (No), processing unit 10 determines that the road white line is not included within each of the white line candidate point detecting regions and the routine returns to step S2. At this time, at step S2, the initial setting of the size of each of the white line candidate point detecting regions is again executed in the same way as described above. It is noted that, at step S2, in this case, the size of each white line candidate point detecting region is preferably set again to become a larger value than that of the initial setting. On the other hand, if processing unit 10 detects that the number of the detected white line candidate points are equal to or greater than the prescribed value, the routine goes to step S8. As shown in FIG. 12, a deviation quantity in the X-axis direction between the presently detected white line candidate point and a point on the white line model calculated during a previous execution time is calculated for each white line candidate point. Then, the routine goes to a step S9. At step S9, variation quantities Δa through Δe associated with road parameters on the basis of deviation quantities of the respective points are calculated. These variation quantities Δa through Δe may be calculated using such a least square method as exemplified by a Japanese Patent Application First Publication No. Heisei 8-005388 published on Jan. 12, 1996. It is noted that the above-described parameters a through e are correlated as shown by the following equation (17) and f denotes a focal length of photographing device 1.

$$a = -y_v/h \quad b = -\rho h f^2 \quad c = \phi_v f \quad d = -\eta f \quad e = w/h \quad (17).$$

Then, if variation quantities Δa through Δe of the parameters are calculated, the routine shown in FIG. 4 goes to a step S10 in which parameters a through e are corrected in accordance with the following equation (18) on the basis of parameter variation quantities Δa through Δe.

$$a = a + \Delta a \quad b = b + \Delta b \quad c = c + \Delta c \quad d = d + \Delta d \quad e = e + \Delta e \quad (18).$$

Then, parameters a through e corrected in this way are stored in a predetermined memory area as parameters a through e in accordance with the road parameters on the new white line models and, thereafter, the routine returns to step S3.

Next, an operation of the above-described road white line recognition apparatus in the preferred embodiment will be described below.

If such a road white line detection processing as shown in FIG. 4 is activated, the initial setting of the road parameters (initialization of the road parameters) is executed (for example, the value which corresponds to the case where the vehicle is located at the center position of the traffic lane is set as the initial value). Then, the routine goes to step S2 in which the initialization of the size of each white line candidate point detecting region is carried out. For example, as shown in FIG. 7, six (and totally twelve) white line candidate point detecting regions are set for each (or all) of the left-side and right-side road white lines. Then, the white line candidate point detecting regions set at step S2 are set in such a manner that the white line models based on the road parameters are placed at the center of the white line candidate point detecting regions (at step S3). Then, the image information is inputted from photographing device 1 (at step S4).

Then, the detection processing of the white line candidate point(s) is executed at the corresponding white line candidate point detecting region set at step S3 (at step S6). In details, the representative search lines, as shown in FIG. 7, are constituted by the upper side of each white line candidate point detecting region and the lower side of the lowest white line candidate point detecting region (at step S21). In the case of FIG. 7, since six white line candidate point detecting regions are set for each of the left-side and right-side white line models, seven representative search lines are set for each of the left and right white line models, as appreciated from FIG. 7. For each of the representative search lines, parameters ai and bi which satisfy above-described equation (8) are calculated. The interpolation process in the Y-axis direction is carried out on the basis of parameters ai and bi between one of the representative search lines of i=0 and the other representative search line of i=1 and on the basis of representative search lines Y(i) (i=0 through 6 corresponding to the left-side road white line) to calculate parameters A(Y) and B(Y) corresponding to Y-axis coordinate. Parameters ai and bi of arbitrary lines within the uppermost white line candidate point detecting region with the representative search line of i=0 as the upper side of the region and the representative search line of i=1 as the lower side thereof are calculated. Deflection luminance $P_{tend}$ of the pixels belonging to an arbitrary line within the corresponding white line candidate point detecting region is obtained from parameters ai and bi and equation (8).

For each of the white line candidate point detecting regions, the image information constituted by deflection luminance $P_{tend}$ is, thus, derived. In the same way, the interpolation process is carried out in the Y-axis direction between representative search lines of i=1 and i=2. Thus, the image information constituted by deflection luminance $P_{tend}$ in each white line candidate point detecting region corresponding to the left-side road white line is derived. By carrying out the processing in the similar way, the image information constituted by deflection luminance $P_{tend}$ of the white line candidate point detecting region corresponding to the left-side road white line can be derived. The same processing is carried out for each of the white line candidate point detecting regions corresponding to the right-side road white line. By carrying out the interpolation processing between respective representative search lines of i=7 through 13, the image information constituted by deflection luminance $P_{tend}$ of each of the white line candidate point detecting regions corresponding to the right-side road white line can be derived (step S24). Then, processing unit 10 calculates normalized luminance $P_{nom}$ by subtracting deflection luminance $P_{tend}$ of each corresponding pixel obtained at step S24 from the luminance value of each pixel of the image information inputted from photographing device 1 for each white line candidate point detecting region. Consequently, the normalized image can be obtained (step S25).

The maximum luminance value and the average luminance value for the normalized image are calculated for each white line candidate point detecting region at step S26. At step S27, luminance threshold value T(i) is calculated from equation (16) on the basis of the above-described maximum and average luminance values. At step S28, in the normalized image, one of the line segments on which the number of pixels whose luminance values are equal to or higher than luminance threshold value T(i) are equal to or greater than the prescribed number and which has the maximum number of pixels whose luminance values are equal to or greater than the luminance threshold value T(i) is determined to be the white line candidate line segment (step S28). The pixels on the upper side and lower side positions of the white line candidate line segment in each of the white line candidate point detecting regions are selected as white line candidate points at step S29.

Figure 13A:
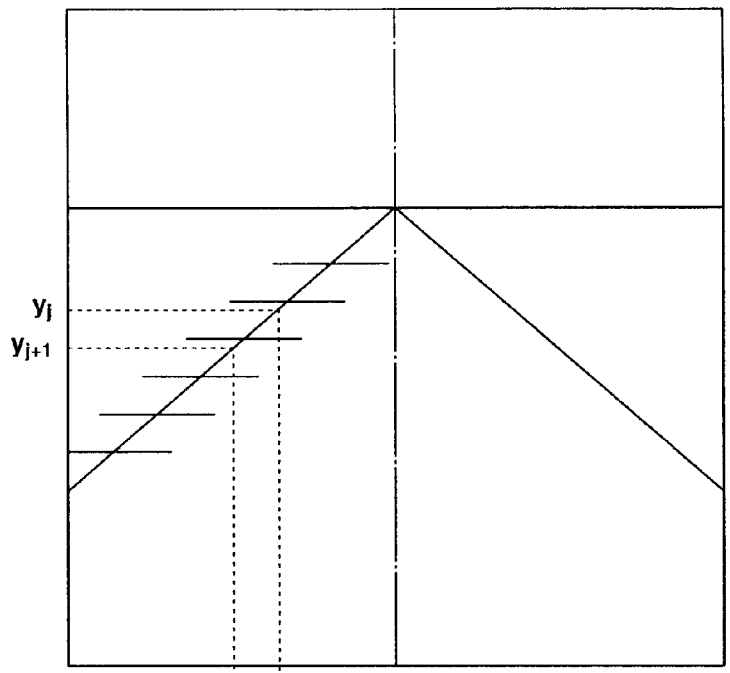
FIGS. 13A, 13B, and 13C are explanatory view for explaining an operation of the rod white line recognition apparatus in the embodiment shown in FIG. 1.
Figure 13B:
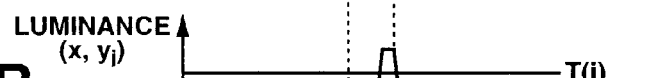
Figure 13C:
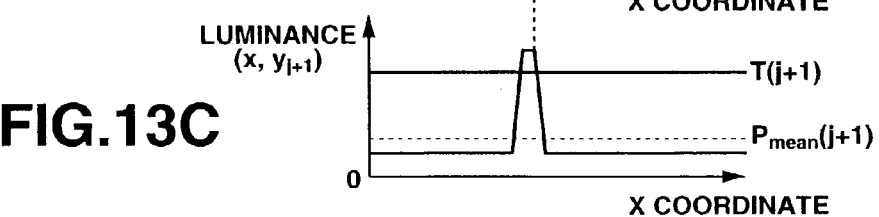

Then, if the total number of the white line candidate points detected at respective white line candidate point detecting regions is not equal to or greater than the prescribed value, processing unit 10 has determined that the road white line is not detected and sets again the size of each white line candidate point detecting region and carries out again the detection of the white line candidate points. When the total number of the detected white line candidate points are equal to or above the prescribed value, deviation quantities between the white line candidate points and points on white line models prescribed by the road parameters are detected. Variation quantities Δa through Δe between the white line candidate points and point on the white line model prescribed by the road parameters are detected. On the basis of the deviation quantities, variation quantities Δa through Δe of the parameters correlated to the road parameters are calculated. The parameters are corrected on the basis of these variation quantities and new road parameters are derived on the basis of the corrected parameters (steps S8 through S10 in FIG. 4). Now, in a case where the vehicle is running on a road surface without a rain puddle whose optical condition is preferable as shown in FIG. 13A, no optical influence is received. Hence, the luminance value is separated into that of a road white line portion and that of the portion other than the road white line(s). Hence, since no deflection occurs in the luminance value in the photographed image, calculated deflection luminance $P_{tend}$ indicates a relatively low value. The normalized image obtained by subtracting deflection luminance $P_{tend}$ from luminance information of the inputted photographed image is substantially equivalent to the inputted photographed image, as shown in FIGS. 13B and 13C. Since there is a clear difference in the luminance value between the portion of the road white line(s) and the portion other than the road white line(s), the luminance value is calculated for each white line candidate point detecting region. The maximum value of the luminance provides a value in accordance with the luminance of the road white line. In addition, average value $P_{mean}$ of the luminance indicates a deviation toward the luminance value of the portion other than the road white line. Hence, threshold value T(i) calculated on the basis of these luminance values is set to a lower value as compared with the luminance of the road white line. Hence, the binarization is executed with threshold value T(i) as a reference, the portion of the road white line is clearly separated into binary (1, 0). On the basis of this binary value, the white line candidate points are detected. Hence, an accurate detection of the white line candidate points can be achieved.

It is noted that FIGS. 13B and 13C represent variation situations of the X-axis direction luminance at positions of $y_j$ and $y_{j+1}$ in FIG. 13A. The lateral axis of FIGS. 13B and 13C denotes X coordinate and the longitudinal axis thereof denotes the luminance.

Figure 14A:
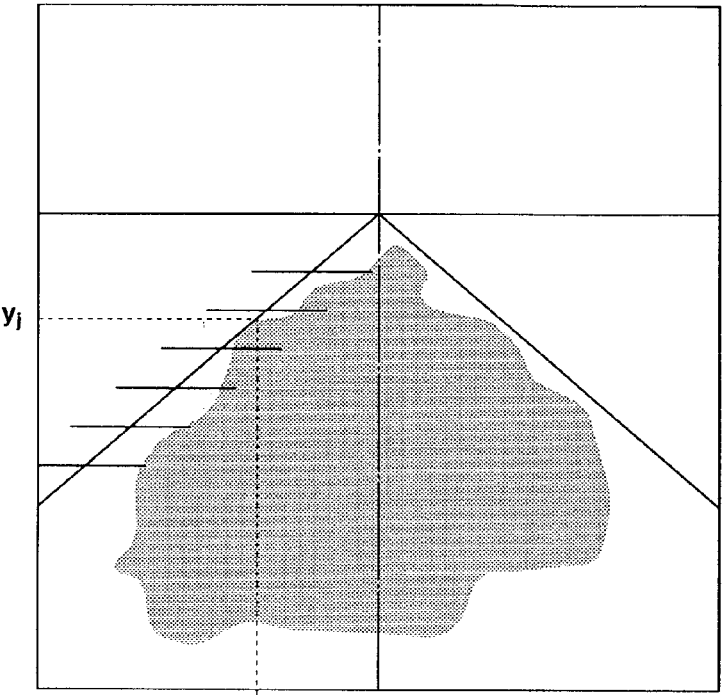
FIGS. 14A, 14B, and 14C are explanatory view for explaining the operation of the rod white line recognition apparatus in the embodiment shown in FIG. 1.
Figure 14B:
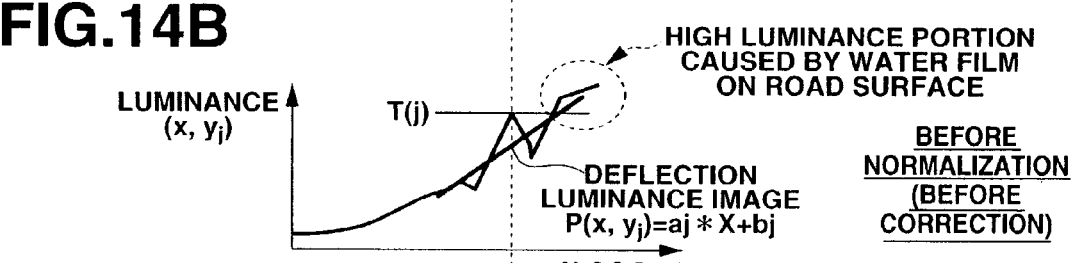

On the other hand, in a case where the vehicle is running on the road surface having a water puddle under a rainy weather, reflected light intensity due to a water film becomes stronger as the position becomes approached to the front area of the vehicle or as the position becomes far away from photographing device 1. Hence, a luminance distribution of the photographed image gives as shown by FIGS. 14A and 14B. Consequently, the luminance value at the road white line portion and that at the water film portion become equal to each other and becomes uneasy to be separated from each other.

Figure 14C:
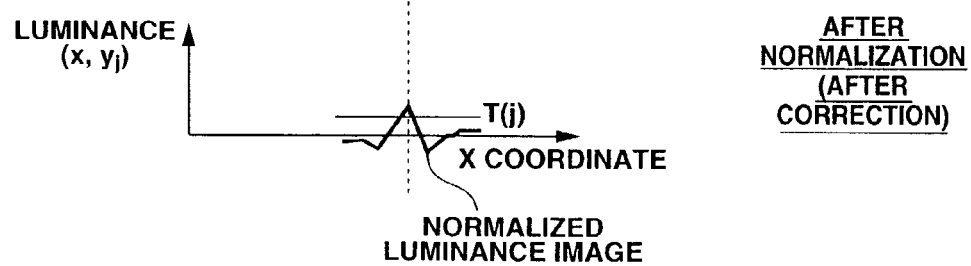

It is noted that deflection luminance $P_{tend}$ is such that the luminance value of the photographed image is approximated using the first-order function for X coordinate direction. Hence, the deflection luminance image provides such an image that high-frequency components thereof with respect to a spatial luminance variation are eliminated and a spatial deflection of the luminance and a spatial deflection of the luminance is extracted as a drift component of the luminance. Hence, the normalized luminance image obtained by subtracting the deflection luminance image from the inputted photographed image can be obtained as a picture image in which the deflection on the luminance is corrected for the inputted image information, as shown in FIG. 14C.

Hence, the maximum value and the average value of the luminance value are determined for each white line candidate point detecting region on the basis of the normalized luminance image. When threshold value T(i) is set on the basis of the maximum value and average value of the luminance, average value $P_{mean}$ of luminance does not receive an influence of a drift component due to the deflection of the luminance caused by the presence of such a water puddle as described above. In details, the luminance value in the X-axis direction of the inputted image receives the influence caused by the water puddle. Hence, as shown in FIG. 14B, it is difficult to recognize the portion corresponding to the road white line(s) and the portion other than the road white lines from the variation in the luminance value. In details, the luminance value in the X-axis direction in the inputted image receives the influence caused by the water puddle. Hence, as shown in FIG. 14B, it is difficult to recognize the portion corresponding to the road white lines and the portion other than the road white lines from the variation in the luminance value.

However, the variation in luminance value in the X-axis direction is approximated by means of the first-order function and the drift component obtained from the approximated first-order function is excluded. Thus, as shown by FIG. 14C, the threshold value is set on the basis of the normalized image which does not receive the influence of the drift component due to the deflection of the luminance caused by the presence of the water puddle. At this time, the variation in the luminance value at an edge portion of the water puddle is relatively moderate as compared with the variation at an edge position of each or one of the road white lines. Hence, the luminance in the X-axis direction is large at the road white line portion and is relatively small as compared with the luminance corresponding to the road white line portion. Hence, since average value $P_{mean}$ of the luminance indicates a small value as compared with the maximum value of the luminance, namely, as compared with the luminance corresponding to the road white line, the average value is deviated toward the luminance value corresponding to the portion other than the road white line. If the threshold value T(i) based on this luminance value is calculated, threshold value T(i) indicates a value smaller than the maximum value of the luminance value. Therefore, the white line candidate points can accurately be detected which corresponds to the road white lines without the reception of the influence from the water puddle by detecting the white line candidate points on the basis of the normalized luminance image using the threshold value T(i) set in the way described above. Consequently, a detection accuracy of the white line candidate points can be improved and the detection accuracy of the road parameters calculated on the basis of white line candidate points can also be improved. In addition, since, at this time, the deflection luminance image is approximated to the first-order function, unknown parameters required when approximating the deflection luminance image may only be a(i) and b(i). Hence, an increase of calculation load can be suppressed at maximum. In addition, since parameters ai and bi specifying equation (8) which is the approximation function of the deflection luminance are not detected only for all horizontal lines but only for the representative search lines and the lines placed between these representative search lines are detected by interpolating between parameters ai and bi on the representative search lines, the calculation time can be shortened and a continuity of the horizontal lines can be assured.

Since, if only parameters ai and bi are stored in a storage area of processing unit 10 for the respective representative lines, the normalized luminance at an arbitrary pixel can easily be detected, the deflection luminance image and normalized luminance image can easily be calculated during the processing step when the road white line detecting process shown in FIGS. 4 and 5 is executed. Hence, the processing can be simplified, the calculation time can be shortened, and the whole storage area can be saved. It is noted that since, in the above-described embodiment, in a case where the water puddle is present at the forward direction of the vehicle, the reflected light intensity becomes higher as the position of the vehicle body approaches to the vehicle front center portion, it can be deemed that the luminance on the portion deviated toward the traffic lane becomes smaller than that on the portion located on the center of the traffic lane. That is to say, the luminance at the detecting region of the left-side road white line is increased as the X coordinate becomes large in the positive direction and it can be determined that, in the detecting region of the right-side road white line, it can be deemed that the luminance becomes smaller as X coordinate value becomes negatively larger. Hence, parameters ai and bi in equation (8) indicates a positive value in the left-side road white line detecting regions and indicates a negative value in the right-side road white line detecting region, as shown in FIG. 10.

Hence, in the case of the representative search line corresponding to the left-side road white line, parameters ai and bi are set so that equation (8) is satisfied and equation (8) indicates a monotone increasing function. On the contrary, in the case of the representative search line corresponding to the right-side road white line, parameters ai and bi may be set so that equation (8) is satisfied and equation (8) indicates a monotone decreasing function. Thus, in a case where, for example, an extreme value is present in a distribution of the luminance of the photographed image in the X-axis direction, the settings of parameters ai and bi described above can prevent erroneous settings of parameters ai and bi due to the influence of the extreme values.

In addition, in the above-described preferred embodiment, parameters ai and bi for the respective representative search lines are detected for the respective search lines to detect the approximation function, the interpolation between parameters ai and bi of the representative search lines is carried out to detect the approximation function, and the deflection luminance for each horizontal line is carried out on the basis of the latter approximation function. However, the present invention is not limited to the above-described procedure. For example, the approximation function is detected for each of the representative search lines and the deflection luminance of the representative search lines may be calculated on the basis of the detected approximation function and the interpolation between deflection luminance values of the respective representative search lines may be carried out to detect the deflection luminance between the representative search lines. In addition, the approximation function is detected only for the representative search lines, the parameters of the approximation function are interpolated to detect the approximation function for the plurality of lines between the representative search lines, on the basis of the approximation function of the representative search lines and the approximation function on the lines between the representative search lines, the deflection luminance values for the respective lines within the white line candidate point detecting regions may be detected.

In addition, in the above-described embodiment, in a case where a gradient of the approximation function is sufficiently small, viz., in a case where the variation in the luminance of the deflection luminance image is small, processing unit 10 may determine that the optical condition is preferable and may set the threshold value on the basis of the inputted image information without calculation of the normalized luminance image. This can avoid the excessive closing of both of the average luminance value and the luminance maximum value to each other and the reduction in the detection accuracy of the white line candidate points when the optical condition is preferable can be prevented from occurring.

Figure 15:
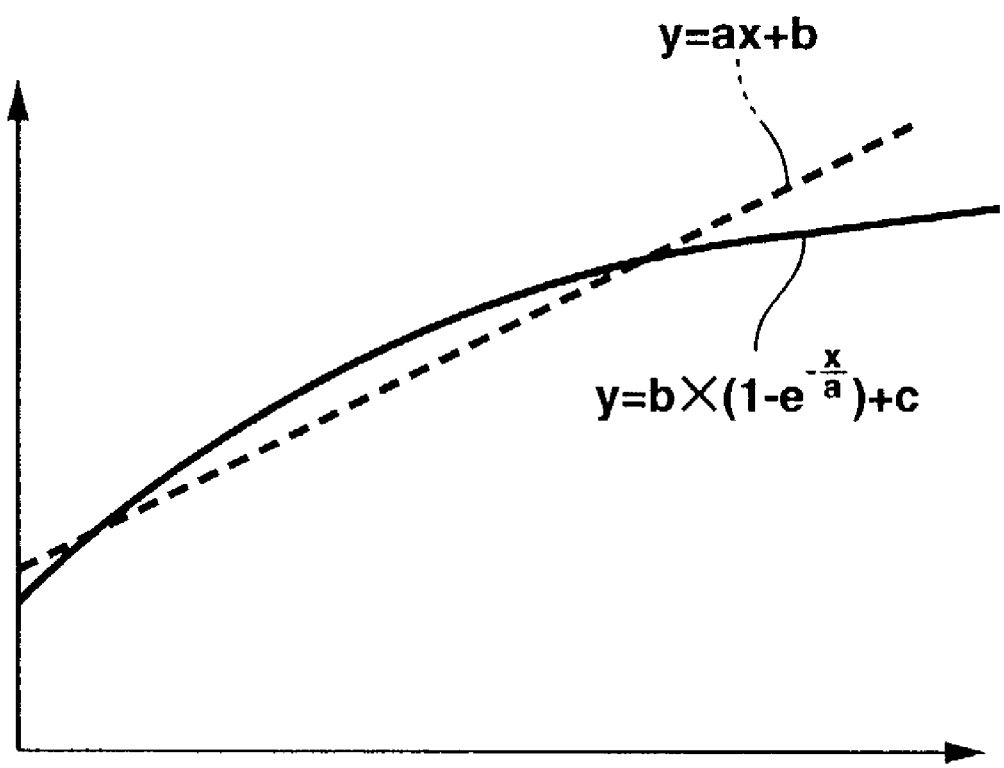
FIG. 15 is a graph representing examples of an approximation function used in the preferred embodiment of the road white line recognition apparatus shown in FIG. 1.

In the above-described embodiment, the approximation function of deflection luminance image is the first-order function, i.e., a straight line. However, the present invention is not limited to this. It is possible for the deflection luminance image to be approximated to a monotonous function, namely, a function without the extreme values. It is possible to use such a function as shown in FIG. 15 and as expressed in the following equation (19).

$$P(X) = b \times (1 - e^{-X/a}) + c \quad (19).$$

It is noted that, in a case where the approximation of the deflection luminance image is carried out using the equation (19), unknown parameters to be calculated are three of a, b, and c. The calculation load is, thus, slightly increased as compared with the straight line approximation. However, it is possible to make a highly accurate approximation since it is possible to use a curved line as the approximation function. Hence, it is effective in a case where a tendency of the deflection in the luminance is shifted in the curved line manner in the X-axis direction.

In the above-described embodiment, the binarization process is carried out for the normalized luminance image at step S28 shown in FIG. 5 on the basis of the luminance threshold value T(i) calculated at step S27 and the extraction of the white line candidate line segment is carried out for the binarized normalized luminance image. However, the present invention is not limited to this. The extraction of the white line candidate points may be carried out without binarization for the normalized luminance image.

In the above-described embodiment, a Sobel filtering process is carried out for the image information to calculate the differentiation. Thus, the differentiation image in which a vicinity to a boundary portion of each road white line is emphasized is generated. At the white line candidate line segment extraction process at step S28, before the detection of the boundary position of the road white line using the normalized image, a portion which may be deemed to be the white line is more precisely limited on the basis of a magnitude of the luminance value (gray scale value) of the differentiated image which corresponds to a spatial luminance variation of an original image and, thereafter, the extraction process of the white line candidate line segment may be carried out. As described above, the quality of calculation required for the extraction process of the line segments within each white line candidate point detecting region can be reduced and the calculation time can be shortened.

In addition, in each of the preferred embodiments, the threshold value is determined on the basis of the maximum luminance and the average luminance at the detecting region set on the normalized image and the white line candidate points are detected on the basis of this threshold value. However, the present invention is not limited to this. Any one of methods for recognizing the road white lines on the basis of the luminance information may be applied equally to the present invention.

It is noted that, in each of the above-described embodiments, photographing device 1 corresponds to photographing means, processes at steps S21 through S23 shown in FIG. 5 correspond to deflection luminance information detecting means, the process at step S24 corresponds to normalized luminance information detecting means, the processes at steps S25 to S29 and those at steps S7 through S10 shown in FIG. 4 correspond to road white line detecting means, and processes at steps S27 through S29 correspond to white line candidate point detecting means.

The entire contents of a Japanese Patent Application No. 2001-367542(filed in Japan on Nov. 30, 2001) are herein incorporated by reference. The scope of the invention is defined with reference to the following claims.

What is claimed is:

1. A road white line recognition apparatus, comprising:
  a photographing device that photographs a road extended in a forward direction of a vehicle;
  a deflection luminance detecting section that detects a deflection luminance information when a luminance information of an image photographed by the photographing device is represented by a luminance information that a surface of the road naturally has and the deflection luminance information from which the luminance information that the road surface naturally has is excluded on the basis of an approximation function obtained by approximating the luminance information of the photographed image to a horizontal direction of the photographed image;
  a normalized luminance information detecting section that detects a normalized luminance information by excluding the deflection luminance information from the luminance information of the photographed image; and
  a road white line detecting section that detects a road white line on the basis of the normalized luminance information detected by the normalized luminance information detecting section.

2. A road white line recognition apparatus as claimed in claim 1, wherein the road white line detecting section comprises a white line candidate point detecting section that sets a threshold value to detect the road white line on the basis of the normalized luminance information detected by the normalized luminance information detecting section and detects white line candidate points of the road white line on the basis of the set threshold value and the normalized luminance information and the road white line detecting section detects the road white line on the basis of the white line candidate points detected by the white line candidate point detecting section.

3. A road white line recognition apparatus as claimed in claim 2, wherein the normalized luminance information detecting section detects a normalized luminance image by subtracting a luminance value of a deflection luminance image of the deflection luminance information from the luminance value of the photographed image and by providing the image represented by the subtracted luminance value as $P_{nom}(X, Y)=P(X, Y)-P_{tend}(X, Y)$, wherein X denotes a horizontal rightward direction positional coordinate of the photographed image, Y denotes a vertical downward direction positional coordinate of the photographed image.

4. A road white line recognition apparatus as claimed in claim 3, wherein the deflection luminance image of the luminance value of the photographed image $P_{tend}(X, Y)$ is detected by approximating X-axis direction of the photographed image with a first-order function and by linear interpolating the deflection luminance image of the X-axis direction in each representative search line for the Y-axis direction of the photographed image.

5. A road white line recognition apparatus as claimed in claim 4, wherein the road white line candidate point detecting section comprises a white line candidate point detecting region setting section that sets a plurality of white line candidate point detecting regions on the photographed image on the basis of estimated values of road parameters and wherein the normalized luminance information detecting section detects the normalized luminance image $P_{nom}(X, Y)$ for each white line candidate point detecting region.

6. A road white line recognition apparatus as claimed in claim 5, wherein each representative search line is set to be a horizontal line such that parameters on all white line candidate point detecting regions are enabled to be calculated.

7. A road white line recognition apparatus as claimed in claim 6, wherein the white line candidate point detecting section comprises: an average luminance calculating section that calculates an average luminance $P_{mean}(i)$ from the normalized luminance image $P_{nom}$ for each white line candidate point detecting region; and a maximum luminance value calculating section that calculates a maximum luminance $P_{max}(i)$ from the normalized luminance image $P_{nom}$ for each white line candidate point detecting region and the white line candidate point detecting section sets the luminance threshold value T(i) for each white line candidate point detecting region as follows: (i)=$\zeta P_{mean}(i)+(1-\zeta) P_{mean}(i)$, wherein $0<\zeta<1$.

8. A road white line recognition apparatus as claimed in claim 7, wherein the white line candidate point detecting section further comprises a white line candidate line segment extracting section that executes a binarization for the normalized luminance image $P_{nom}$ on the basis of the set luminance threshold value T(i) and extracts a white line candidate line segment in each white line candidate point detecting region for the binarized normalized luminance image.

9. A road white line recognition apparatus as claimed in claim 8, wherein the white line candidate line segment extracting section searches all line segments in each white line candidate point detecting region, each line segment being formed by connecting any one point of an upper side of each white line candidate point detecting region to any one of a lower side thereof measures the number of pixels whose gray levels are equal to or higher than the luminance threshold value T(i) from among the pixels on all searched line segments, and selects one of the line segments on which the number of the pixels whose gray levels are equal to or higher than the luminance threshold value T(i) are most as a white line candidate line segment.

10. A road white line recognition apparatus as claimed in claim 9, wherein the white line candidate point detecting section detects a start point of the selected white line candidate line segment and an end point thereof as white line candidate points in a corresponding one of the white line detecting regions.

11. A road white line recognition apparatus as claimed in claim 10, wherein the white line candidate point detecting section further comprises a white line candidate point confirming section that confirms whether the number of the pixels on the selected white line candidate line segment whose gray levels are equal to or higher than the luminance threshold value T(i) are equal to or greater than a prescribed number and wherein the white line candidate point detecting section detects the start point and end point of the selected white line candidate line segment as the white line candidate points when the white line candidate point confirming section confirms that the number of the pixels on the selected white line candidate line segment whose gray levels are equal to or higher than the luminance threshold value T(i) are equal to or greater than the prescribed number.

12. A road white line recognition apparatus as claimed in claim 11, wherein the white line candidate point detecting region setting section sets again the white line candidate point detecting regions when the white line candidate point confirming section confirms that the number of the pixels on the selected white line candidate line segment whose gray levels are equal to or higher than the luminance threshold value T(i) are less than the prescribed number.

13. A road white line recognition apparatus as claimed in claim 1, wherein the deflection luminance detecting section detects the approximation function for each of a plurality of representative search lines which are set from among horizontal lines of the photographed image which provide mutually vertical intervals to one another, detects the approximation function for each of the representative search lines, and detects the approximation function for each of horizontal lines present between two mutually adjacent representative search lines by interpolating parameters specifying the approximation function for each of the two mutually adjacent representative search lines.

14. A road white line recognition apparatus as claimed in claim 1, wherein the deflection luminance detecting section detects the deflection luminance for each of a plurality of representative search lines which are set from among horizontal lines of the photographed image which provide mutually vertical intervals to one another, detects the deflection luminance information on the basis of the approximation function for each of the representative search lines, and detects the deflection luminance information for each of horizontal lines present between two mutually adjacent representative search lines by interpolating the deflection luminance information for the two mutually adjacent representative search lines.

15. A road white line recognition apparatus as claimed in claim 1, wherein the deflection luminance detecting section sets a plurality of first regions to detect a right-side road white line as viewed externally through the photographed image and a plurality of second regions to detect a left-side road white line as viewed externally through the photographed image, detects the approximation function for each of the first and second regions, and sets a monotone decreasing function constituting the approximation function in each of the first regions to detect the right-side road white line and a monotone increasing function constituting the approximation function in each of the second regions to detect the left-side road white line, when a positional coordinate is set in such a manner that as the photographed image advances toward a horizontal rightward direction, its positional coordinate value becomes larger.

16. A road white line recognition apparatus as claimed in claim 1, wherein the approximation function is a first-order function.

17. A road white line recognition apparatus as claimed in claim 1, wherein the normalized luminance information detecting section detects a normalized luminance image by subtracting a luminance value of a deflection luminance image of the deflection luminance information from the luminance value of the photographed image and by providing the image represented by the subtracted luminance value as $P_{nom}(X, Y) = P(X, Y) - P_{tend}(X, Y)$, wherein X denotes a horizontal rightward direction positional coordinate of the photographed image, Y denotes a vertical downward direction positional coordinate of the photographed image.

18. A road white line recognition apparatus, comprising:
photographing means for photographing a road extended in a forward direction of a vehicle;
deflection luminance detecting means for detecting deflection luminance information when a luminance information of an image photographed by the photographing means is represented by a luminance information that a surface of the road naturally has and the deflection luminance information from which the luminance information that the road surface naturally has is excluded on the basis of an approximation function obtained by approximating the luminance information of the photographed image to a horizontal direction of the photographed image;
normalized luminance information detecting means for detecting a normalized luminance information by removing the deflection luminance information from the luminance information of the photographed image; and
road white line detecting means for detecting a road white line on the basis of the normalized luminance information detected by the normalized luminance information detecting means.

19. A road white line recognition method, comprising:
photographing a road extended in a forward direction of a vehicle through a photographing device;
detecting a deflection luminance information when a luminance information of an image photographed by the photographing device is represented by a luminance information that a surface of the road naturally has and the deflection luminance information from which the luminance information that the road surface naturally has is excluded on the basis of an approximation function obtained by approximating the luminance information of the photographed image to a horizontal direction of the photographed image;
detecting a normalized luminance information by excluding the deflection luminance information from the luminance information of the photographed image; and
detecting a road white line on the basis of the detected normalized luminance information.

20. A road white line recognition apparatus, comprising:
a deflection luminance detecting section that detects a deflection luminance information when a luminance information of an image photographed by a photographing device is represented by a luminance information that a surface of the road naturally has and the deflection luminance information from which the luminance information that the road surface naturally has is excluded on the basis of an approximation function obtained by approximating the luminance information of the photographed image to a horizontal direction of the photographed image;
a normalized luminance information detecting section that detects a normalized luminance information by excluding the deflection luminance information from the luminance information of the photographed image; and
a road white line detecting section that detects a road white line on the basis of the normalized luminance information detected by the normalized luminance information detecting section.

* * * * *